United States Patent
Dettinger et al.

(10) Patent No.: US 8,224,872 B2
(45) Date of Patent: Jul. 17, 2012

(54) AUTOMATED DATA MODEL EXTENSION THROUGH DATA CRAWLER APPROACH

(75) Inventors: Richard D. Dettinger, Rochester, MN (US); Daniel P. Kolz, Rochester, MN (US); Richard J. Stevens, Rochester, MN (US); Jeffrey W. Tenner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 2242 days.

(21) Appl. No.: 10/877,235

(22) Filed: Jun. 25, 2004

(65) Prior Publication Data
US 2005/0289123 A1    Dec. 29, 2005

(51) Int. Cl.
*G06F 7/00* (2006.01)
*G06F 17/30* (2006.01)
(52) U.S. Cl. .................................................... 707/804
(58) Field of Classification Search .................. None
See application file for complete search history.

(56) References Cited

U.S. PATENT DOCUMENTS
6,725,227 B1 * 4/2004 Li ............................... 707/102
6,928,431 B2    8/2005 Dettinger et al.

OTHER PUBLICATIONS

Dettinger et al., IBM U.S. Appl. No. 10/132,228, filed Apr. 25, 2002, "Dynamic End User Specific Customization of an Application's Physical Data Layer Through a Data Repository Abstraction Layer".

* cited by examiner

*Primary Examiner* — Michael Hicks
(74) *Attorney, Agent, or Firm* — Patterson & Sheridan LLP

(57) ABSTRACT

Methods, systems, and articles of manufacture for accessing data stored in multiple data sources. Such methods employ an automated software agent to maintain a collection of data sources available for querying. The data sources may all reside within a single local network or may be distributed throughout multiple locations. Generally, the automated software agent searches a given domain for additional data sources according to a defined set of selection criteria. After discovering an additional data source, the automated software agent configures a query application to reflect the availability the additional data source. Further, the automated software agent may periodically evaluate the collection of data sources against the selection criteria and remove those that are either no longer available or no longer satisfy the selection criteria.

32 Claims, 11 Drawing Sheets

```
                                                              ← 700
┌─────────────────────────────────────────────────────────────────┐
│ Field                                                           │
│ 702 ─ Name = "CreditRatingDescription"                          │
│ 704 ─ Access Method = "Simple-Remote"                           │
│         URL = "jdbc:driverid://remotesystem.abc.com/creditschema"│
│         JDBC Driver = "com.xyz.com.driverclass"                 │
│         Table = "credit_t"                                      │
│         Column = "desc"                                         │
└─────────────────────────────────────────────────────────────────┘
```

FIG. 7

```
                                                              ← 800
┌─────────────────────────────────────────────────────────────────┐
│ Field                                                           │
│ 802 ─ Name = "CreditRating"                                     │
│ 804 ─ Access Method = "Procedural"                              │
│         Service Spec = "http://www.mysite.org/services/CreditService.wsdl" │
│         Service Name = "Credit"                                 │
│         Port Name = "CreditPort"                                │
│         Operation = "getCreditRating"                           │
│         Input                                                   │
│                 Parm                                            │
│                         Name = "LastName"                       │
│                         Value = "LastName                       │
│         Output                                                  │
│                 Name = "CreditRating"                           │
└─────────────────────────────────────────────────────────────────┘
```

FIG. 8

AUTOMATED DATA MODEL EXTENSION THROUGH DATA CRAWLER APPROACH

CROSS-REFERENCE TO RELATED APPLICATIONS

This application is related to U.S. patent application Ser. No. 10/132,228 filed Apr. 25, 2002, entitled "Dynamic End User Specific Customization Of An Application's Physical Data Layer Through A Data Repository Abstraction Layer" and assigned to International Business Machines, Inc., which is hereby incorporated by reference in its entirety.

BACKGROUND OF THE INVENTION

1. Field of the Invention

The present invention generally relates to data processing and more particularly to a system and method employing a software agent that is configured to search for new data sources and to maintain existing data repositories.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways.

Regardless of the particular architecture, in a DBMS, a requesting entity (e.g., an application, the operating system or a user) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

One of the issues faced by data mining and database query applications, in general, is their close relationship with a given database schema (e.g., a relational database schema). This relationship makes it difficult to support an application as changes are made to the corresponding underlying database schema. Further, the migration of the application to alternative underlying data representations is inhibited. In today's environment, the foregoing disadvantages are largely due to the reliance applications have on SQL, which presumes that a relational model is used to represent information being queried. Furthermore, a given SQL query is dependent upon a particular relational schema since specific database tables, columns and relationships are referenced within the SQL query representation. As a result of these limitations, a number of difficulties arise.

One difficulty is that changes in the underlying relational data model require changes to the SQL foundation that the corresponding application is built upon. Therefore, an application designer must either forgo changing the underlying data model to avoid application maintenance or must change the application to reflect changes in the underlying relational model. Another difficulty is that extending an application to work with multiple relational data models requires separate versions of the application to reflect the unique SQL requirements driven by each unique relational schema. Yet another difficulty is evolution of the application to work with alternate data representations because SQL is designed for use with relational systems. Extending the application to support alternative data representations, such as XML, requires rewriting the application's data management layer to use non-SQL data access methods.

A typical approach used to address the foregoing problems is software encapsulation. Software encapsulation involves using a software interface or component to encapsulate access methods to a particular underlying data representation. An example is found in the Enterprise JavaBean (EJB) specification that is a component of the Java 2 Enterprise Edition (J2EE) suite of technologies. In the case of EJB, entity beans serve to encapsulate a given set of data, exposing a set of Application Program Interfaces (APIs) that can be used to access this information. This is a highly specialized approach requiring the software to be written (in the form of new entity EJBs) whenever a new set of data is to be accessed or when a new pattern of data access is desired. The EJB model also requires a code update, application build and deployment cycle to react to reorganization of the underlying physical data model or to support alternative data representations. EJB programming also requires specialized skills; since more advanced Java programming techniques are involved. Accordingly, the EJB approach and other similar approaches are rather inflexible and costly to maintain for general-purpose query applications accessing an evolving physical data model.

In addition to the difficulties of accessing heterogeneous data representations, today's environment is complicated by the fact that data is often highly distributed and dynamic. Pervasive infrastructures like the Internet include a host of data sources which must be made accessible to users in order to be of value. Conventional solutions dealing with localized, homogenized data are no longer viable and developing solutions to deal with distributed and heterogeneous data is problematic because such solutions must have knowledge of the location of each data source and must provide unique logic (software) to deal with each different type of data representation. As a result, typical solutions (such as the provision of data warehouses containing all of the information required by applications using the warehouse) do not easily adapt to changes in the location or representation of the data being consumed and cannot easily be redeployed to work with a different data topology. The data warehouse also presents problems when there is a need to expand the content of the warehouse with additional, publicly available information. In some cases, the external data source may be very large and subject to change. It can be very costly to maintain a local copy of such data within a given data warehouse.

Therefore, in environments where new data sources may become available, and where existing ones may become unavailable, there is a need for flexible method for maintaining a underlying collection of data sources available to a database query application.

SUMMARY OF THE INVENTION

The present invention is generally directed to a method, system and article of manufacture used to maintain a collection of data sources that are made available to a querying entity. Generally, an automated software agent (commonly referred to herein as a data crawler) is configured to search a given domain for both changes in existing data sources and for new data sources. In either case, the data crawler is responsible for configuring the database query application to include new (or modified) data sources when executing queries. In one embodiment in which an environment uses an abstraction layer to create separate query fields from the underlying physical representation of data, the data crawler also updates the abstract data model to reflect the new (or modified) data sources.

One embodiment of the invention provides a method of providing access to data in an environment of multiple data repositories. The method generally includes providing a requesting entity with a data abstraction model comprising a plurality of logical fields use in composing an abstract query, and for each of the plurality of logical fields, providing an access method which specifies at least a method for accessing the data and a location of the data. The method further includes invoking an automated software agent configured to traverse a data domain; and updating the data abstraction model in response to determinations made by the automated software agent.

Another embodiment of the invention provides a method of maintaining a collection of data repositories available to a database query application. The method generally includes invoking an automated software agent configured, (i) to periodically evaluate existing data repositories in the collection of data repositories, (ii) to traverse a data domain to identify potential additional data repositories, (iii) evaluate identified potential additional data repositories for inclusion in the collection of data repositories, and (iv) to update the database query application to reflect any changes to the collection of data repositories as a result of the evaluation of newly discovered data sources and periodic evaluation of the existing data repositories.

Another embodiment of the invention provides a system for maintaining a collection of distributed data repositories. The system of generally includes a network environment, comprising multiple data repositories, and a data abstraction model, wherein the data abstraction model comprises a plurality of logical fields used to compose an abstract query, and for each logical field, providing an access method specifying at least a method for accessing the data and a location of the data. The system further generally includes a query engine configured to (i) resolve an abstract query into a query consistent with a particular physical data representation of the data stored in at least one of the multiple data repositories, and (ii) to execute the query against the data; wherein the location of the at least one of the multiple data repositories is specified in the data abstraction model in association with a logical field contained in the abstract query. The system further generally includes an automated software agent configured to (i) search for additional data repositories that become accessible from the network environment, and (ii) to evaluate newly discovered data repositories for inclusion in the data abstraction model.

Another embodiment of the invention provides computer readable medium containing a program which, when executed, generally performs operations that maintain the availability of a collection of multiple data repositories accessed in a network environment, The operations generally include instantiating a software agent configured to search within a data domain to discover potential additional data repositories and to evaluate newly discovered data repositories for inclusion in the set of multiple data repositories.

Another embodiment of the invention provides a method for providing access to data in an environment of multiple data repositories. The method generally includes providing, for a requesting entity, a data abstraction model comprising a plurality of logical fields for composing an abstract query; and for each of the plurality of logical field, specifying at least a method for accessing data and a location of the data in one or more of a set of data repositories. The method generally further includes invoking an automated software agent configured to (i) traverse a data domain to identify potential additional data repositories, (ii) evaluate identified potential additional data repositories for inclusion in the set of data repositories, (iii) update the data abstraction model to reflect potential additional data repositories that satisfy the evaluation according to a set of selection criteria, (iv) periodically evaluate the plurality of data repositories according to the selection criteria, (v) update the data abstraction model based on the periodic evaluation of existing data sources according to the selection criteria.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 7 is field specification of a data repository abstraction component configured with a relational access method;

FIG. 8 is a field specification of a data repository abstraction component configured with a procedural access method;

DETAILED DESCRIPTION OF THE PREFERRED EMBODIMENTS INTRODUCTION

Figure 1:
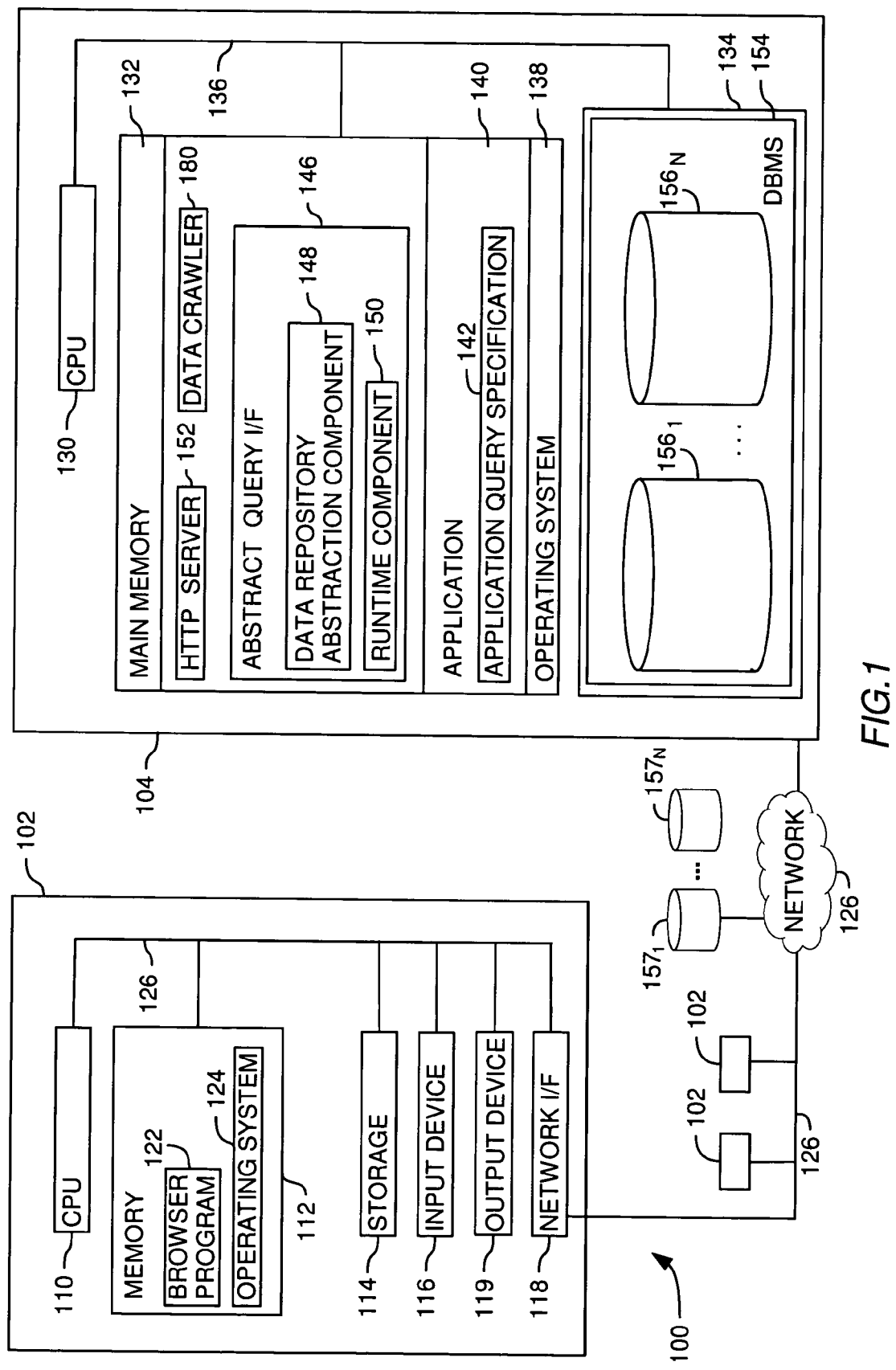
FIG. 1 is a computer system illustratively used in accordance with the invention.

The present invention is generally directed to a system, method and article of manufacture for maintaining a collection of data sources made available to a data query engine. In one embodiment, a data crawler operates autonomously in a distributed environment wherein users query a variety of data sources through a data repository abstraction layer. The abstraction layer encapsulates an abstract data model modeling underlying physical data sources in a logical manner. In one embodiment, the data crawler is configured to execute operations to search for new data sources and update the query engine and the data repository abstraction layer to reflect the newly discovered data source.

In an environment with distributed data sources, the data repository abstraction layer is configured to include a location specification identifying the location of the data source to be accessed. The data repository abstraction layer provides a logical view of one or more underlying data repositories that is independent of the underlying physical data representation.

A runtime component may be configured to include, for example, an abstract query engine and a federated query engine. The abstract query engine translates an abstract query (constructed according to the query abstraction layer) into a form used by the federated query engine against a particular physical data representation to find and retrieve data. The execution time function of the federated query engine is to process queries during program run time (i.e., to execute the translated query). As the physical data representations stored in data sources evolve over time, and as new data repositories are discovered, the data crawler updates the data repository abstraction layer and the federated query engine to reflect these changes.

One embodiment of the invention is implemented as a program product for use with a computer system such as, for example, the computer system 100 shown in FIG. 1 and described below. The program(s) of the program product defines functions of the embodiments (including the methods described herein) and can be contained on a variety of signal-bearing media. Illustrative signal-bearing media include, without limitation: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Physical View of Data Crawler Environment

As described above, a data crawler may be configured to operate within distributed computing environment. FIG. 1 illustrates a block diagram of a networked system 100 in which embodiments of the present invention may be implemented. In general, the networked system 100 includes a client (e.g., user's) computer 102 (three such client computers 102 are shown) and at least one server 104 (one such server 104). The client computer 102 and the server computer 104 are connected via a network 126. In general, the network 126 may be a local area network (LAN) and/or a wide area network (WAN). In a particular embodiment, the network 126 is the Internet.

The client computer 102 includes a Central Processing Unit (CPU) 110 connected via a bus 130 to a memory 112, storage 114, an input device 116, an output device 119, and a network interface device 118. The input device 116 can be any device to give input to the client computer 102. For example, a keyboard, keypad, light-pen, touch-screen, track-ball, or speech recognition unit, audio/video player, and the like could be used. The output device 119 can be any device to give output to the user, e.g., any conventional display screen. Although shown separately from the input device 116, the output device 119 and input device 116 could be combined. For example, a display screen with an integrated touch-screen, a display with an integrated keyboard, or a speech recognition unit combined with a text speech converter could be used.

The network interface device 118 may be any entry/exit device configured to allow network communications between the client computer 102 and the server computer 104 via the network 126. For example, the network interface device 118 may be a network adapter or other network interface card (NIC).

Storage 114 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 114 could be part of one virtual address space spanning multiple primary and secondary storage devices.

The memory 112 is preferably a random access memory sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips.

Illustratively, the memory 112 contains an operating system 124. Illustrative operating systems, which may be used to advantage, include Linux® and Microsoft's Windows®. More generally, any operating system supporting the functions disclosed herein may be used.

The memory 112 is also shown containing a browser program 122 that, when executed on CPU 110, provides support for navigating between the various servers 104 and locating network addresses at one or more of the servers 104. In one embodiment, the browser program 122 includes a web-based Graphical User Interface (GUI), which allows the user to display Hyper Text Markup Language (HTML) information. More generally, however, the browser program 122 may be any GUI-based program capable of rendering the information transmitted from the server computer 104.

The server computer 104 may be physically arranged in a manner similar to the client computer 102. Accordingly, the server computer 104 is shown generally comprising a CPU 130, a memory 132, and a storage device 134, coupled to one another by a bus 136. Memory 132 may be a random access memory sufficiently large to hold the necessary programming and data structures that are located on the server computer 104.

The server computer 104 is generally under the control of an operating system 138 shown residing in memory 132. Examples of the operating system 138 include IBM OS/400®, UNIX, Microsoft Windows®, and the like. More generally, any operating system capable of supporting the functions described herein may be used.

The memory 132 further includes one or more applications 140 and an abstract query interface 146. The applications 140 and the abstract query interface 146 are software products comprising a plurality of instructions that are resident at various times in various memory and storage devices in the computer system 100. When read and executed by one or more processors 130 in the server 104, the applications 140 and the abstract query interface 146 cause the computer system 100 to perform the steps necessary to execute steps or elements embodying the various aspects of the invention. The applications 140 (and more generally, any requesting entity, including the operating system 138 and, at the highest level, users) issue queries against a database. Illustrative against which queries may be issued include local databases $156_1 \ldots 156_N$, and remote databases $157_1 \ldots 157_N$, collectively referred to as database(s) 156-157). Illustratively, the databases 156 are shown as part of a database management system (DBMS) 154 in storage 134. More generally, as used herein, the term "databases" refers to any collection of data regardless of the particular physical representation. By way of illustration, the databases 156-157 may be organized according to a relational schema (accessible by SQL queries) or according to an XML schema (accessible by XML queries). The invention, however, is not limited to any particular schema and may readily be extended to operate on schemas presently unknown. As used herein, the term "schema" generically refers to a particular arrangement of data.

The queries issued by the applications 140 are defined according to an application query specification 142 included with each application 140. The queries issued by the applications 140 may be predefined (i.e., hard coded as part of the applications 140) or may be generated in response to input (e.g., user input). In either case, the queries (referred to herein as "abstract queries") are composed using logical fields defined by the abstract query interface 146. In particular, the logical fields used in the abstract queries are defined by a data repository abstraction component 148 of the abstract query interface 146. The abstract queries are executed by a runtime component 150 that transforms the abstract queries into a form consistent with the physical representation of the data contained in one or more of the databases 156-157. For some embodiments, the runtime component may be configured to include an abstract query engine configured to process the abstract query into a concrete query and a federated query engine configured to process the concrete query. The application query specification 142 and the abstract query interface 146 are further described with reference to FIGS. 2A-B.

A user may specify the contents of an abstract query user through a graphical user interface (GUI). The content of the GUIs is generated by the application(s) 140. In a particular embodiment, the GUI content is hypertext markup language (HTML) content which may be rendered on the client computer systems 102 with the browser program 122. Accordingly, the memory 132 includes a Hypertext Transfer Protocol (http) server process 138 (e.g., a web server) adapted to service requests from the client computer 102. For example, the process 152 may respond to requests to access a database(s) 156, which illustratively resides on the server 104. Incoming client requests for data from a database 156-157 invoke an application 140. When executed by the processor 130, the application 140 causes the server computer 104 to perform the steps or elements embodying the various aspects of the invention, including accessing the database(s) 156-157. In one embodiment, the application 140 comprises a plurality of servlets configured to build GUI elements, which are then rendered by the browser program 122. Where the remote databases 157 are accessed via the application 140, the data repository abstraction component 148 is configured to include a location specification identifying the database containing the data to be retrieved.

Within this environment, embodiments of the present invention may be configured to dynamically monitor the availability and structure of local databases $156_{1-N}$ and remote databases $157_{1-N}$. As these databases evolve, a data crawler 180 (sometimes referred to herein as a data source crawler) may update (e.g., add, remove, or supplement) the logical fields that are available to compose an abstract query. Additionally, the data crawler may configure the federated query engine 170 to include newly found (or remove deleted) data sources from databases 156 and 157. The data source crawler 180 may comprise a separate process loaded into memory 132 of server computer 104. The data crawler acts as an automated software agent that searches for additional data sources. In a federated environment (i.e., an environment where data sources may reside in multiple, distributed locations) the federated query engine 170 takes a query specification as input and executes the query against one or more data sources (e.g. an SQL query against a relational data source, an X query against an XML data source and the like). In addition to search and select operations, other input/output the query engine also carries out other operations, including well-known operations such as add, modify, insert, delete on the underlying physical data sources.

FIG. 1 is merely one hardware/software configuration for the networked client computer 102 and server computer 104. Embodiments of the present invention can apply to any comparable hardware configuration, regardless of whether the computer systems are complicated, multi-user computing apparatus, single-user workstations, or network appliances that do not have non-volatile storage of their own. Further, it is understood that while reference is made to particular markup languages, including HTML, the invention is not limited to a particular language, standard or version. Accordingly, persons skilled in the art will recognize that the invention is adaptable to other markup languages as well as non-markup languages and that the invention is also adaptable future changes in a particular markup language as well as to other languages presently unknown. Likewise, the http server process 138 shown in FIG. 1 is merely illustrative and other embodiments adapted to support any known and unknown protocols are contemplated.

Figure 2A:
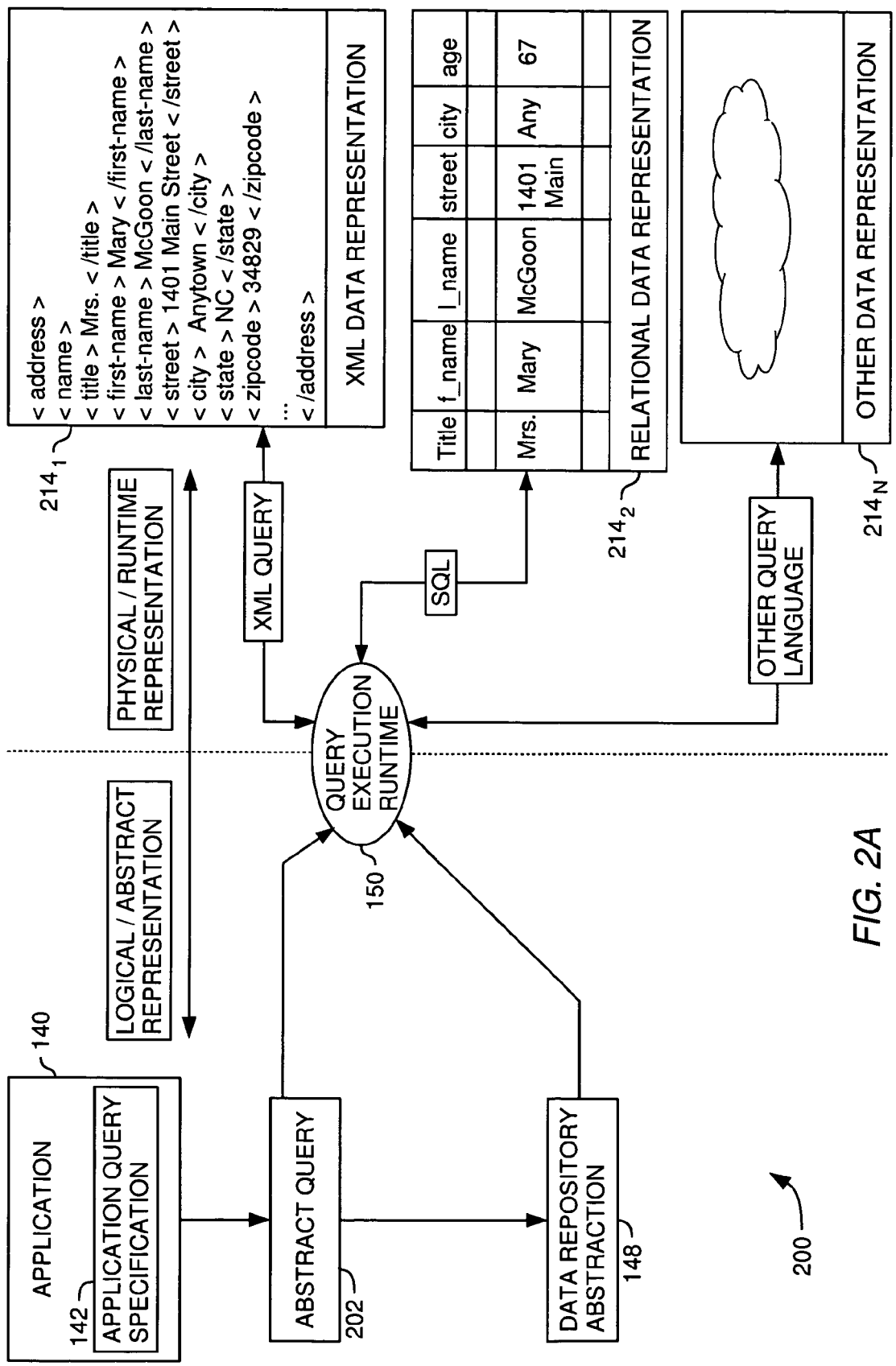
FIG. 2A is an illustrative relational view of software components.
Figure 2B:
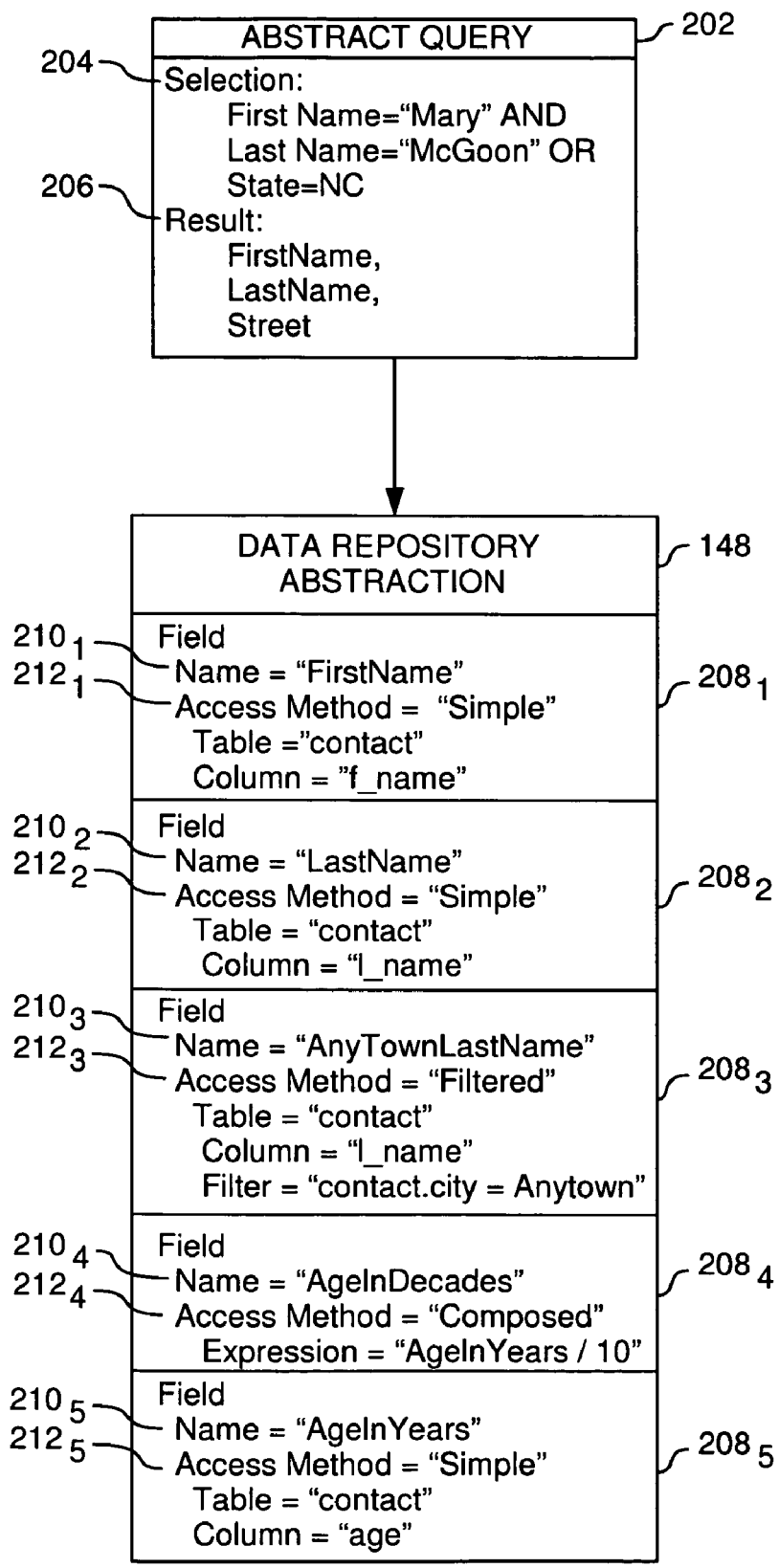
FIG. 2B is one embodiment of an abstract query and a data repository abstraction for a relational data access.

FIGS. 2A-B show a plurality of interrelated components that may be manipulated by embodiments of the present invention. In addition to the automated processing engaged in by the data crawler 180, users (e.g., system administrators) manually configure the components described below. The requesting entity (e.g., one of the applications 140) issues a query 202 as defined by the respective application query specification 142 of the requesting entity. The resulting query 202 is generally referred to herein as an "abstract query" because the query is composed according to abstract (i.e., logical) fields rather than by direct reference to the underlying physical data entities in the databases 156-157. As a result, abstract queries may be defined that are independent of the particular underlying data representation used. In one embodiment, the application query specification 142 may include both criteria used for data selection (selection criteria 204) and an explicit specification of the fields to be returned (return data specification 206) based on the selection criteria 204. In one embodiment, the data crawler is configured to dynamically update the logical fields available to compose an abstract query as it discovers changes in the underlying data sources.

The logical fields specified by the application query specification 142 and used to compose the abstract query 202 are defined by the data repository abstraction component 148. In general, the data repository abstraction component 148 exposes information as a set of logical fields that may be used within a query (e.g., the abstract query 202) issued by the application 140 to specify criteria for data selection and specify the form of result data returned from a query operation. The logical fields are defined independently of the underlying data representation being used in the databases 156-157, thereby allowing queries to be formed that are loosely coupled to the underlying data representation.

In general, the data repository abstraction component 148 comprises a plurality of field specifications $208_1$, $208_2$, $208_3$, $208_4$ and $208_5$ (five shown by way of example), collectively referred to as the field specifications 208. Specifically, a field specification is provided for each logical field available for composition of an abstract query. Each field specification comprises a logical field name $210_1$, $210_2$, $210_3$, $210_4$, $210_5$ (collectively, field name 210) and an associated access method $212_1$, $214_2$, $212_3$, $212_4$, $212_5$ (collectively, access method 212). The access methods associate (i.e., map) the logical field names to a particular physical data representation $214_1$, $214_2$ ... $214_N$ in a database (e.g., one of the databases 156). By way of illustration, two data representations are shown, an XML data representation $214_1$ and a relational data representation $214_2$. However, the physical data representation $214_N$ indicates that any other data representation, known or unknown, is contemplated. Note that an abstract query need not include a reference to each field in the data repository abstraction component 148, instead, queries are composed only using the fields of interest for a particular query. Over time, the data crawler may update the logical fields that may be used to compose an abstract query corresponding to changes in the underlying data representations $214_{1-N}$.

Any number of access methods is contemplated, depending upon the number of different types of logical fields to be supported. In one embodiment, access methods for simple fields, filtered fields and composed fields to reflect changes in the underlying data repositories are provided. The field specifications $208_1$, $208_2$ and $208_5$ exemplify simple field access methods $212_1$, $212_2$, and $212_5$, respectively. Simple fields are mapped directly to a particular entity in the underlying physical data representation (e.g., a field mapped to a given database table and column). As illustrated, the field specifications 208 depict only a subset of the logical fields available to compose an abstract query. For example, the abstract query 202 includes a result field 206 labeled "street," that is not shown for the data repository abstraction component 148. This field, however, would have a field specification included in the data repository abstraction component 148 constructed to define a mapping from the logical field "street" to a physical location of the corresponding data. Referring to FIG. 2A, for example, data repository $214_1$ depicts an XML physical data representation with a nested element labeled "Street" to which an access method could map By way of illustration, the simple field access method $212_1$ shown in FIG. 2B maps the logical field name $210_1$ ("FirstName") to a column named "f_name" in a table named "contact". The field specification $208_3$ exemplifies a filtered field access method $212_3$. Filtered fields identify an associated physical entity and provide rules used to define a particular subset of items within the physical data representation. An example is provided in FIG. 2B in which the filtered field access method $212_3$ maps the logical field name $210_3$ ("AnytownLastName") to a physical entity in a column named "l_name" in a table named "contact" and defines a filter for individuals in the city of Anytown. Another example of a filtered field is a New York ZIP code field that maps to the physical representation of ZIP codes and restricts the data only to those ZIP codes defined for the state of New York. The field specification $208_4$ exemplifies a composed field access method $212_4$. Composed access methods compute a logical field from one or more physical fields using an expression supplied as part of the access method definition. In this way, information which does not exist in the underlying data representation may be computed. In the example illustrated in FIG. 2B the composed field access method $212_3$ maps the logical field name $210_3$ "AgeInDecades" to "AgeInYears/10". Another example is a sales tax field that is composed by multiplying a sales price field by a sales tax rate.

The formats for any given data type may vary (e.g., dates, decimal numbers, etc.) from the underlying data. Accordingly, in one embodiment, the field specifications 208 include a type attribute which reflects the format of the underlying data. However, in another embodiment, the data format of the field specifications 208 is different from the associated underlying physical data, in which case an access method is responsible for returning data in the proper format assumed by the requesting entity. Thus, the access method must know what format of data is assumed (i.e., according to the logical field) as well as the actual format of the underlying physical data. The access method can then convert the underlying physical data into the format of the logical field. As the data crawler updates the field specification to include new fields (or modify existing ones) it also updates these additional attributes.

By way of example, the field specifications 208 of the data repository abstraction component 148 shown in FIG. 2 are representative of logical fields mapped to data represented in the relational data representation $214_2$. Other instances of the data repository abstraction component 148, however, map logical fields to other physical data representations, such as XML. Further, in one embodiment, a data repository abstraction component 148 is configured with access methods for procedural data representations. One embodiment of such a data repository abstraction component 148 is described below with respect to FIG. 8. For each of these various embodiments, the data crawler 180, further described below, may be configured to construct a field specification with a logical field and access method corresponding to the underlying data representation. Further, in a federated environment where data sources may be distributed across different networks, the data crawler 180 may be configured to include a location specification with each access method it constructs. Examples of such an embodiment are illustrated below in FIGS. 10 and 11.

An illustrative abstract query corresponding to the abstract query 202 shown in FIG. 2 is shown in Table I below. By way of illustration, the data repository abstraction 148 is defined using XML. However, any other language may be used to advantage.

TABLE I

QUERY EXAMPLE

| | |
|---|---|
| 001 | <?xml version="1.0"?> |
| 002 | <!--Query string representation: (FirstName = "Mary" AND LastName = |
| 003 | "McGoon") OR State = "NC"--> |
| 004 | <QueryAbstraction> |
| 005 |    <Selection> |
| 006 |       <Condition internalID="4"> |
| 007 |          <Condition field="FirstName" operator="EQ" value="Mary" |

TABLE I-continued

QUERY EXAMPLE

```
008         internalID="1"/>
009               <Condition field="LastName" operator="EQ"
                  value="McGoon"
010         internalID="3" relOperator="AND"></Condition>
011               </Condition>
012               <Condition field="State" operator="EQ" value="NC"
                  internalID="2"
013         relOperator="OR"></Condition>
014         </Selection>
015         <Results>
016               <Field name="FirstName"/>
017               <Field name="LastName"/>
018               <Field name="Street"/>
019         </Results>
020   </QueryAbstraction>
```

Illustratively, the abstract query shown in Table I includes a selection specification (lines 005-014) containing selection criteria and a results specification (lines 015-019). In one embodiment, a selection criterion consists of a field name (for a logical filed), a comparison operator (=, >, <, etc) and a value expression (what the field is being compared to). In one embodiment, the result specification is a list of abstract fields that are returned as a result of query execution. A result specification in the abstract query may consist of a field name and sort criteria.

An illustrative instance of a data repository abstraction component 148 corresponding to the abstract query in Table I is shown in Table II below. By way of illustration, the data repository abstraction component 148 is defined using XML. However, any other language may be used to advantage.

TABLE II

DATA REPOSITORY ABSTRACTION EXAMPLE

```
001      <?xml version="1.0"?>
002      <DataRepository>
003            <Category name="Demographic">
004                  <Field queryable="Yes" name="FirstName"
                     displayable="Yes">
005                        <AccessMethod>
006                              <Simple columnName="f_name"
                                 tableName="contact"></Simple>
007                        </AccessMethod>
008                        <Type baseType="char"></Type>
009                  </Field>
010                  <Field queryable="Yes" name="LastName"
                     displayable="Yes">
011                        <AccessMethod>
012                              <Simple columnName="l_name"
                                 tableName="contact"></Simple>
013                        </AccessMethod>
014                        <Type baseType="char"></Type>
015                  </Field>
016                  <Field queryable="Yes" name="State"
                     displayable="Yes">
017                        <AccessMethod>
018                              <Simple columnName="state"
                                 tableName="contact"></Simple>
019                        </AccessMethod>
020                        <Type baseType="char"></Type>
021                  </Field>
022            </Category>
023      </DataRepository>
```

Figure 3:
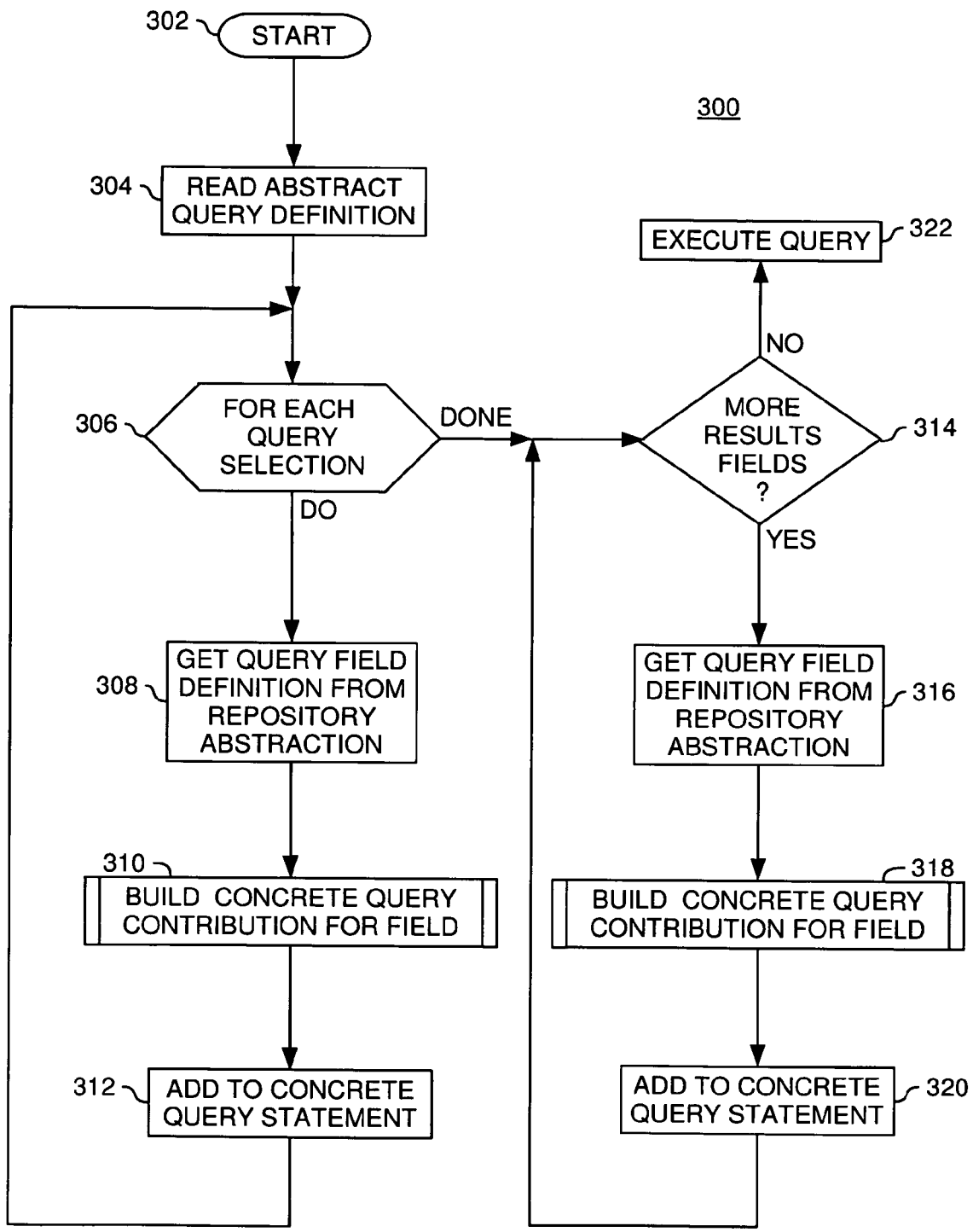
FIGS. 3 and 4 are flow charts illustrating the operation of a runtime component.

FIG. 3 shows an illustrative runtime method 300 exemplifying one embodiment of the operation of the runtime component 150. In one embodiment, the runtime component 150 includes an abstract query engine 160 that may be configured to generate a concrete query using the information included in an abstract query 202 and the data repository abstraction component 148. The method 300 is entered at step 302 when the runtime component 150 receives as input an instance of an abstract query (such as the abstract query 202 shown in FIG. 2). At step 304, the abstract query engine 160 of runtime component parses the instance of the abstract query and locates individual selection criteria and desired result fields. At step 306, the abstract query engine 160 enters a loop (comprising steps 306, 308, 310 and 312) processing each query selection criteria statement present in the abstract query, thereby building a data selection element of a Concrete Query. A selection criterion may comprise a field name (for a logical field), a comparison operator (=, >, <, etc) and a value expression (what is the field being compared to). At step 308, the runtime component 150 uses the field name from a selection criterion of the abstract query to look up the definition of the field in the data repository abstraction 148. As noted above, the field definition includes a definition of the access method used to access the physical data associated with the field. The runtime component 150 then builds (step 310) a Concrete Query Contribution for the logical field being processed.

As used herein, a Concrete Query Contribution is an element of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from a physical data repository, represented by the databases 156-157 shown in FIG. 1. The runtime component 150 then adds the Concrete Query Contribution generated for the current field to a Concrete Query Statement. The method 300 then returns to step 306 to begin processing for the next field of the abstract query. For each data selection field in the abstract query, the process iterates through steps 306-312 additional contributions to the concrete query.

After building the data selection portion of the concrete query, the runtime component 150 identifies the information desired to be returned as a result of query execution. As described above, the abstract query may include a list of abstract fields that are to be returned as a result of query execution, referred to herein as a result specification. A result specification in the abstract query may consist of a field name and sort criteria. Accordingly, the method 300 enters a loop at step 314 (comprising steps 314, 316, 318 and 320) to add result field definitions to the concrete query being generated by runtime component 150. At step 316, the runtime component 150 reads the result field name (from the result specification of the abstract query) and then retrieves a Result Field Definition from the data repository abstraction 148 to identify the physical location of data to be returned for the current logical result field. The runtime component 150 then builds (as step 318) a Concrete Query Contribution (of the concrete query that identifies physical location of data to be returned) for the logical result field. At step 320, Concrete Query Contribution is then added to the Concrete Query Statement. Once each of the result specifications in the abstract query has been processed, the query is executed at step 322. For some embodiments, once the concrete query is complete, a federated query engine 170 included in runtime component 150 carriers out executing the concrete query.

Figure 4:
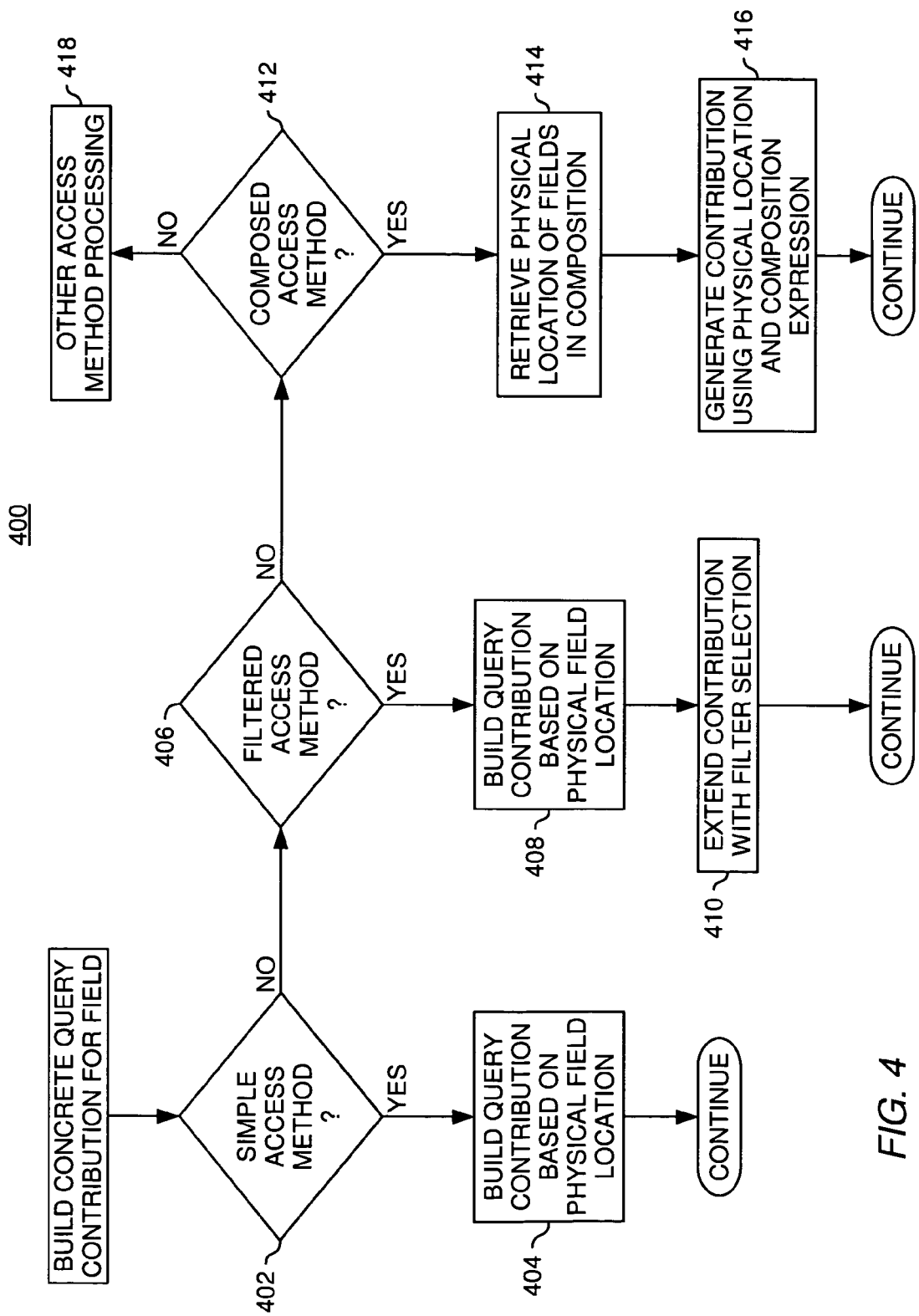

FIG. 4 illustrates one embodiment of a method 400 for building a Concrete Query Contribution from a logical field according to steps 310 and 318. At step 402, the method 400 queries whether the access method associated with the current logical field is a simple access method. If so, the Concrete Query Contribution is built (step 404) based on physical data location information and processing then continues according to method 300 described above. Otherwise, processing continues to step 406 to query whether the access method associated with the current logical field is a filtered access method. If so, the Concrete Query Contribution is built (step 408) based on physical data location information for some physical data entity. At step 410, the Concrete Query Contribution is extended with additional logic (filter selection) used to subset data associated with the physical data entity. Processing then continues according to method 300 described above.

If the access method is not a filtered access method, processing proceeds from step 406 to step 412 where the method 400 queries whether the access method is a composed access method. If the access method is a composed access method, the physical data location for each sub-field reference in the composed field expression is located and retrieved at step 414. At step 416, the physical field location information of the composed field expression is substituted for the logical field references of the composed field expression, whereby the Concrete Query Contribution is generated. Processing then continues according to method 300 described above.

If the access method is not a composed access method, processing proceeds from step 412 to step 418. Step 418 is representative of any other access methods types contemplated as embodiments of the present invention. It should be understood, however, that embodiments are contemplated in which less then all the available access methods are implemented. For example, in a particular embodiment only simple access methods are used. In another embodiment, only simple access methods and filtered access methods are used.

As described above, it may be necessary to perform a data conversion if a logical field specifies a data format different from the underlying physical data. In one embodiment, an initial conversion is performed for each respective access method when building a Concrete Query Contribution for a logical field according to the method 400. For example, the conversion may be performed as part of, or immediately following, the steps 404, 408 and 416. A subsequent conversion from the format of the physical data to the format of the logical field is performed after the query is executed at step 322. Of course, if the format of the logical field definition is the same as the underlying physical data, no conversion is necessary.

Other Embodiments of Data Repository Abstraction Components

In one embodiment, a different single data repository abstraction component 148 is provided for each separate physical data representation 214 (as in FIGS. 2B and 2C). In an alternative embodiment, a single data repository abstraction component 148 contains field specifications (with associated access methods) for two or more physical data representations 214. In yet another embodiment, multiple data repository abstraction components 148 are provided, where each data repository abstraction component 148 exposes different portions of the same underlying physical data (which may comprise one or more physical data representations 214). In this manner, a single application 140 may be used simultaneously by multiple users to access the same underlying data where the particular portions of the underlying data exposed to the application are determined by the respective data repository abstraction component 148. This latter embodiment is described in more detail in U.S. patent application Ser. No. 10/132,228 filed Apr. 25, 2002, entitled "Dynamic End User Specific Customization Of An Application's Physical Data Layer Through A Data Repository Abstraction Layer" and assigned to International Business Machines, Inc., which is hereby incorporated by reference in its entirety.

In any case, a data repository abstraction component 148 contains (or refers to) at least one access method that maps a logical field to physical data. As the foregoing embodiments illustrate, the access methods describe a means to locate and manipulate the physical representation of data that corresponds to a logical field. The data crawler 180 may operate on the data repository abstraction component 148 included in any of the embodiments described above to add, modify or remove fields that may include differing field specifications, access methods and location specifications.

In one embodiment, the data repository abstraction component 148 is extended to include a description of a multiplicity of data sources that can be local and/or distributed across a network environment. The data sources can be using a multitude of different data representations and data access techniques. In one embodiment, this is accomplished by configuring the access methods of the data repository abstraction component 148 to include a location specification that describes the location of the data associated with the logical field, in addition to the access method.

Figure 5:
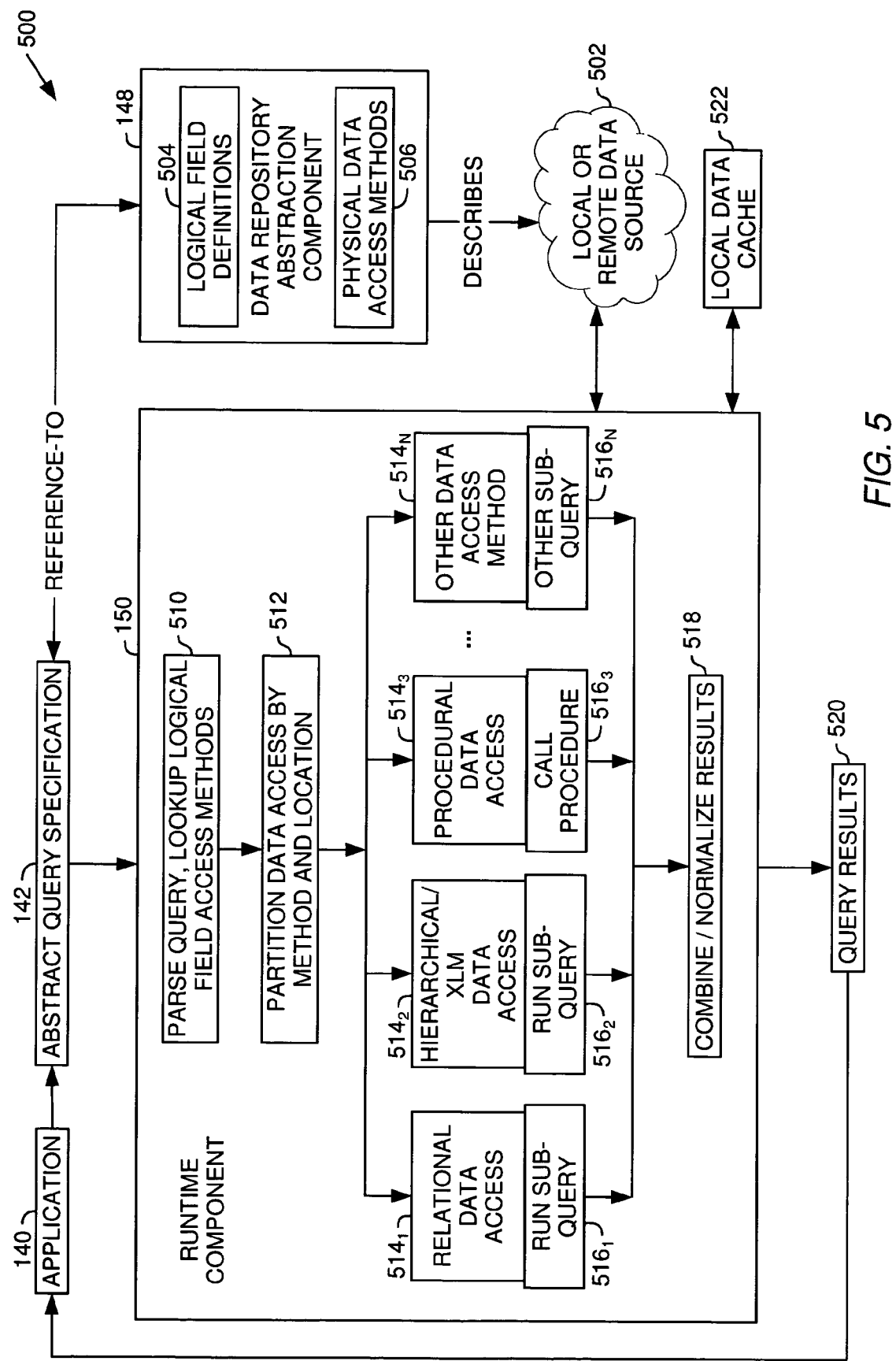
FIG. 5 is an illustrative relational view of software components in which multiple sources of data are accessible.

Referring now to FIG. 5, a logical/runtime view of an environment 500 having a plurality of data sources (repositories) 502 is shown and illustrates one embodiment of the operation of a data repository abstraction component 148 in such an environment. The data sources 502 to be accessed via the data repository abstraction component 148 may be local, remote or both. In one embodiment, the data sources 502 are representative of the databases 156-157 shown in FIG. 1. In general, the data repository abstraction component 148 is similarly configured to those embodiments described above. As such, the data repository abstraction component 148 has logical field definitions and an associated access method for each logical field definition. In contrast to embodiments wherein only a single data source is accessed, however, the access methods are also configured with a location specification in addition to physical representation specifications. The location specifications describe the location of the data source in which the data to be accessed (i.e., the data associated with the logical field definitions) is located. In one embodiment, however, it is contemplated that some access methods may be configured without a location specification, indicating a default to a local data source.

In an environment where data sources are located in distributed locations, the data crawler 180 searches for additional data sources and, when found, updates the data repository abstraction component 148 with fields that include a location specification. In general, FIG. 5 shows the application 140, the abstract query specification 142 (also referred to herein as the application query specification), the data repository abstraction component 148 (used to map logical fields to access methods) and the runtime component 150 responsible for converting an abstract query into one or more data access requests supported by the data repositories 502 containing the physical information being queried. In contrast to some embodiments described above, the data repository abstraction component 148 and runtime component 150 of FIG. 5 are configured to support the definition and query of logical fields having associated data that may be distributed across multiple local and/or remote physical data repositories 502 (also referred to herein as local/remote data sources 502) and which may be accessed via a multitude of query-based and procedural based interfaces.

Figure 6:
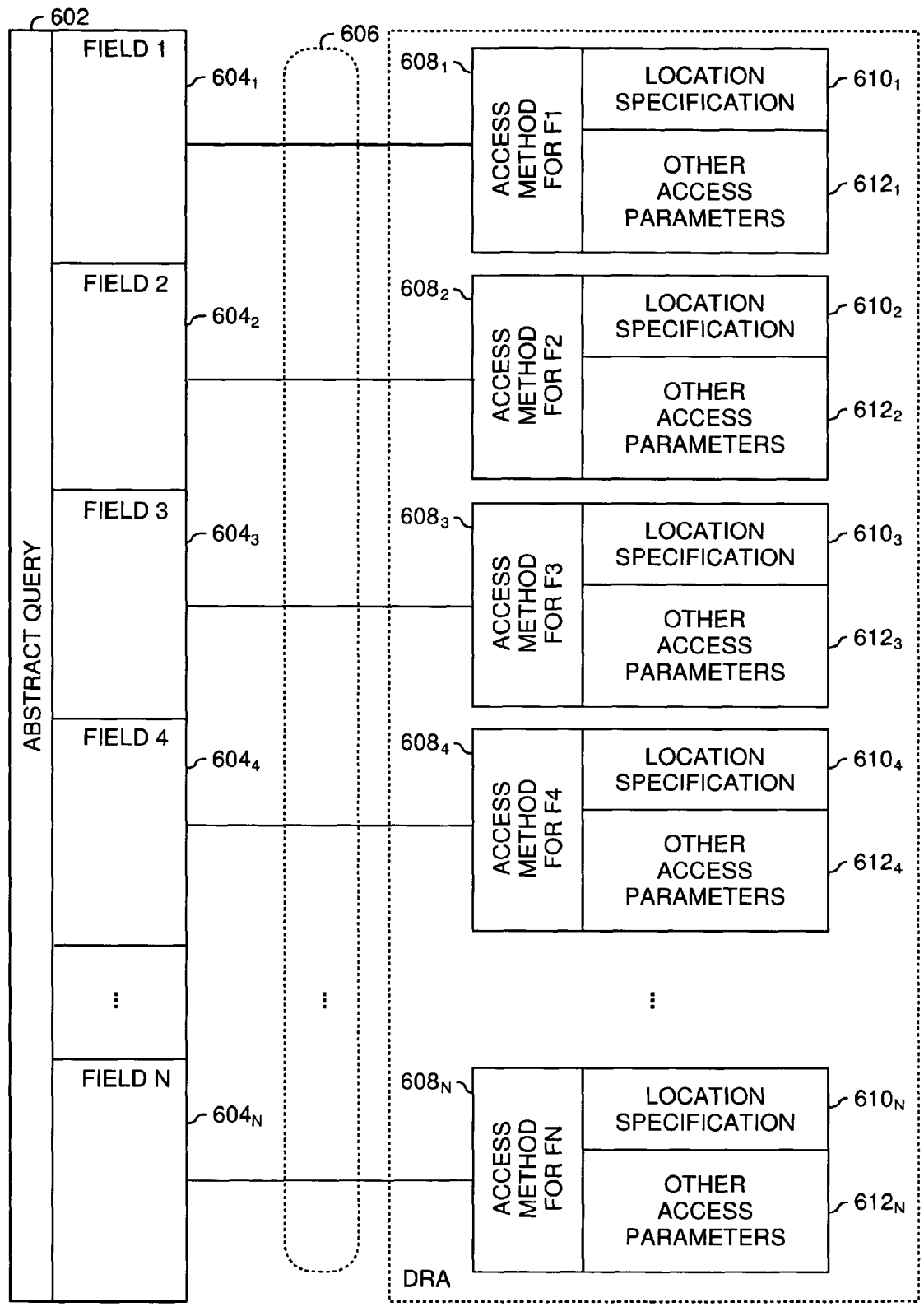
FIG. 6 shows an illustrative abstract query 602 comprising a plurality of logical fields.

To this end, the application 140 defines its data requirements in terms of the abstract query specification 142 which contains query selection and/or update logic based on logical fields, not the physical location or representation of the actual data involved. The data repository abstraction component 148 comprises logical field definitions 504 and an access method 506 for each logical field. The logical field definitions 504 describe the logical fields available for use by the application 140. In one aspect, the data repository abstraction component 148 governs the information available for use by the application 140. Addition of new logical fields, present in a new local or remote data source are thereby made available for use by applications. In one embodiment of the present invention, the data crawler 180 automates the process of discovering new data sources as well as adding new logical fields. In this manner, the application 140 is presented with a consistent interface to a dynamic collection of underlying data. Each access method 506 defines the mapping between a logical field and its physical representation in a local/remote data source 502. FIG. 6 illustrates this relationship.

FIG. 6 shows an illustrative abstract query 602 comprising a plurality of logical fields $604_1 \ldots 604_N$ (collectively the logical fields 604). Each of the logical fields 604 are related (represented by lines 606) to an access method $608_1 \ldots 608_N$ (collectively the access methods 608) by the definition of the particular data repository abstraction component 148. Physical representation information in the access methods 608 includes the name of the access method to be used (here represented as "access method for F1", "access method for F2", etc.) and a plurality of parameters to be passed to the named access method describing how to access the physical data associated with the logical field. In general, such parameters include a locator parameter $610_1 \ldots 610_N$ (collectively the locator parameters 610; also referred to herein as a location specification) and other access parameters needed to access the data (e.g., some data sources may require certain access credentials). A given data repository abstraction component instance may represent information that is managed by multiple local and remote physical data repositories.

FIGS. 7-8 illustrate embodiments in which a data repository abstraction component instance is configured with a location specification and other access parameters needed to access a source. Referring first to FIG. 7, a field specification 700 of a data repository abstraction component configured with a relational access method is shown. The field specification 700 is specific to a particular logical field identified by a field name 702 "CreditRatingDescription" and to an associated access method. As shown, the associated access method name 704 is "simple-remote" indicating that the access method is a simple field access method in which the logical fields are mapped directly to a particular entity in the underlying physical data representation and that the data is remotely located. In this case, the logical field is mapped to a given database table "credit_t" and column "desc". The "URL" is the location specification (locator parameter) which specifies the location of the physical data. In this case, the "URL" includes an identifier of a JDBC driver to use, a remote system name holding the data (remotesystem.abc.com) and a database schema containing the data (creditschema). "JDBC Driver" is the name of the Java class that implements SQL access to this type of remote database.

Referring now to FIG. 8, a field specification 800 of a data repository abstraction component configured with a procedural access method is shown. The field specification 800 is specific to a particular logical field identified by a field name 802 "CreditRating" and having an associated access method. The associated access method name 804 is "procedural" indicating that the access method is a procedural access method. "Service Spec" identifies the Web Services Description Language (WSDL) definition for the web service to access. WSDL is a standard interface definition language for Web Services. Web Services are a standard method used to invoke software applications using the established World Wide Web infrastructure for communication and for using standard data representation technologies such as XML to represent information passed between a calling application and the Web Service that is invoked. "Service Name" identifies the name of the web service to be accessed out of the set of possible services defined within the "Service Spec". "Port Name" identifies the port name for the service to be accessed out of the set of possible port names defined within "Service Name". The named port indicates the network address corresponding to the service. "Operation" is the name of the operation to invoke. Web Services can support more than one function referred to as "operations". "Input" identifies input required when invoking a web service. In this case, a last name value is provided as input to the service. "Output" identifies the output data item that is associated with this logical field. Services may return several pieces of output when they are called. Accordingly "Output" identifies defines the piece of output data that is associated with the current logical field.

Note that in the case of procedural access methods, the field specification of a data repository abstraction component for local data may look substantially identical to the field specification 800 shown in FIG. 8 for accessing remote data. The only difference would be that in the local case, the referenced WSDL document would have a URL pointing back to the local server running the service.

Referring again to FIG. 5, one embodiment of the operation of the runtime component 150 is now described. In general, the runtime component is responsible for building and executing an executable query based on an abstract query. To this end, at block 510, the abstract query engine parses the abstract query and uses the data repository abstraction component 148 to map references to one or more logical fields to their corresponding physical location and method of access (collectively referred to herein as the access methods 506). In one embodiment, the federated query engine of runtime component 150 partitions (block 512) overall physical data query requirements into groups (referred to as "sub-queries" 514) representing access to the same physical resource using the same method of access. The federated query engine then executes the "sub-queries" (block 516). Results from each of the sub-queries 514 are combined and normalized (block 518) before the collective query results 520 are returned to the application 140. One aspect of the query partitioning approach is that the runtime component 150 may run multiple sub-queries in parallel, taking advantage of multi-CPU hardware architectures.

In one embodiment, the runtime component 150 also manages a local data cache 522. The local data cache 522 contains data retrieved for certain logical fields and is used during subsequent queries as a first choice for lookup of logical fields that were identified in the data repository abstraction component as being cache enabled. Logical fields that are advantageously managed in a cached fashion are those whose values are relatively static and/or which incur significant overhead to access (where overhead is measured in either time required to fetch the data or monetary expense of accessing the data, assuming some information is managed in a pay-per-use model).

Data Source Crawler Extension of Data Model

Figure 9:
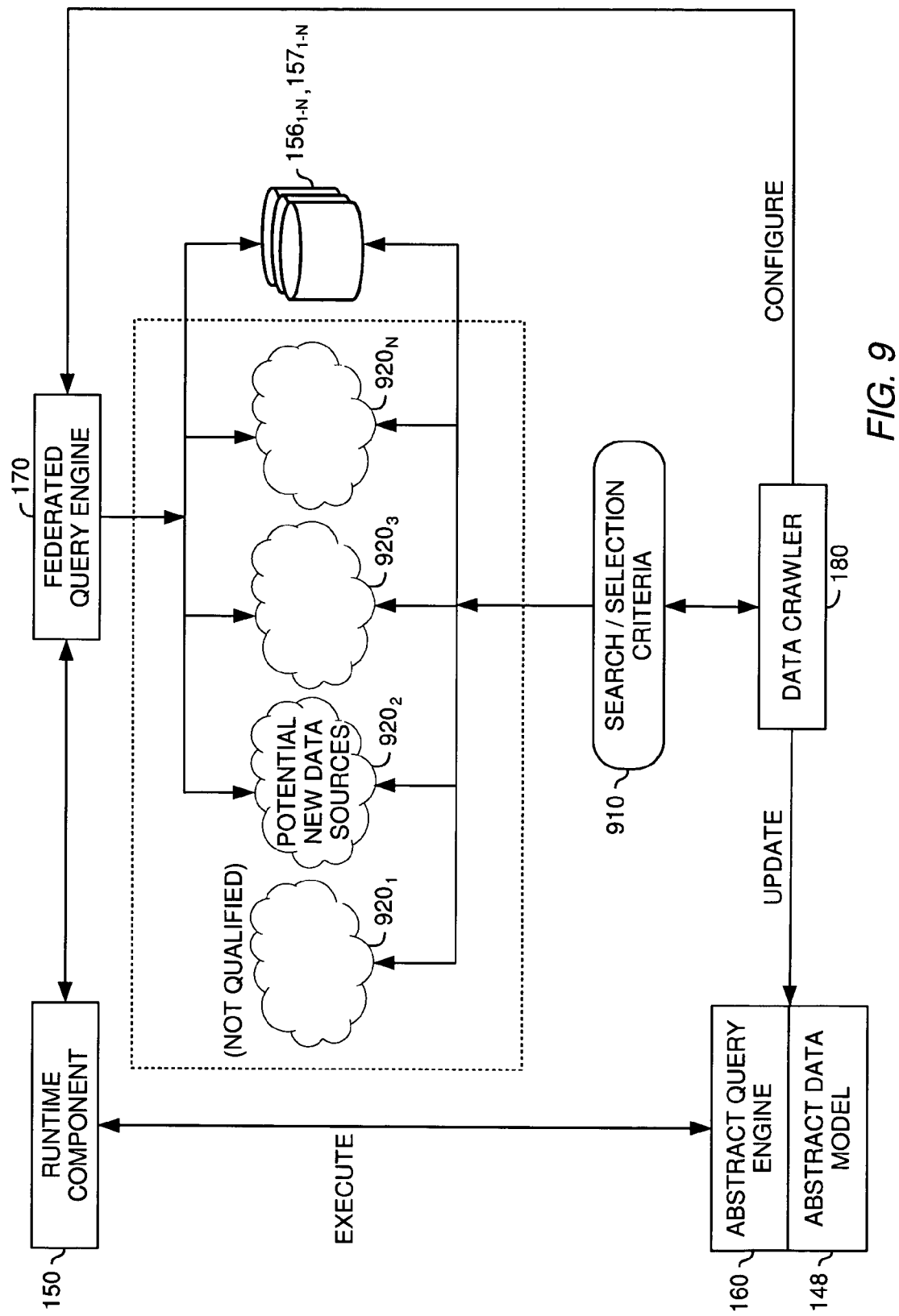
FIG. 9 is a relational view of a data crawler interacting with other components of the system.

The above sections describe a computing environment 100 that may include multiple data sources, an abstraction layer separating the logical nature of information from the underlying physical mechanisms used to store and maintain information, a runtime component configured to query the data sources, and optionally, to first resolve abstract queries into concrete queries. Also described is the interaction among the various components. In addition, reference has been made to a data crawler 180 that may be configured to manipulate some or all of the components to dynamically maintain and extend a data environment. Turning to FIG. 9, embodiments of the operation of the data crawler are now described.

FIG. 9 illustrates a relational view of components that the data crawler 180 may interact with according to one embodiment of the present invention. Generally, the data crawler 180 is a software agent that configures the runtime component 150 and updates the data repository abstraction component 148 to reflect changes in the underlying data sources. Changes include the availability of new data sources $920_{1-N}$ and the obsolescence, modification, or removal of existing data sources 156 and 157 (described in conjunction with FIG. 11). The data crawler 180 may be configured to select (or remove) new data sources base on selection criteria 910.

In an embodiment where all of the data sources reside locally (e.g., $156_{1-N}$), and where the environment does not include a data abstraction layer, the data crawler 180 may operate to monitor the availability of data sources $156_{1-N}$. In addition, as new data sources become available on the server 104, the data crawler 180 may, according to selection criteria 910, modify runtime component 150 to include a reference to a new data source, or remove such a reference when a data source becomes unavailable or deteriorates below thresholds that may be set by selection criteria 910. Thus, runtime component 150 executes queries against an accurate domain of data stored by $156_{1-N}$. The selection criteria 910 provides a set of rules that determine which new data sources should be selected for inclusion or removal as part of the data domain queried by runtime component 150.

In one embodiment, the computing environment 100 may provide application 140 with the ability to query multiple data sources using an abstract query engine 160 included as part of runtime component 150 through the abstract query interface 146. In such an embodiment, logical fields presented as part of the query interface are mapped to the underlying data using a location specification 610 as described above. Generally, the data crawler 180 maintains a robust domain of data sources in such an environment by searching for new data sources $920_{1-N}$, determining which new data sources to add according to selection criteria 910, generating new field specifications 208 corresponding to new data sources and configuring the runtime component 150 and data repository abstraction component 148 to include the new data sources when executing queries.

Figure 10:
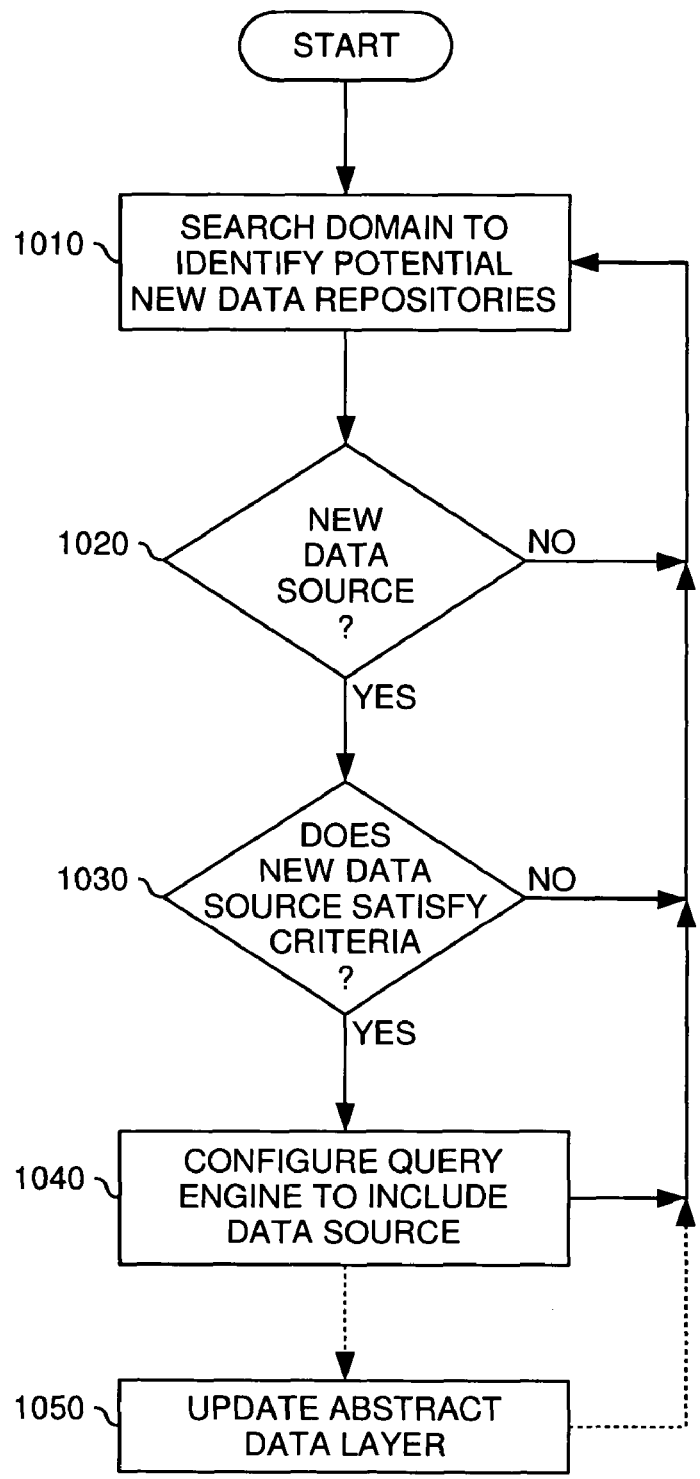
FIGS. 10 and 11 are flow charts illustrating the operations of a data crawler, according to one embodiment of the present invention.

FIG. 10 illustrates operations 1000 of the data crawler 180, according to one embodiment of the present invention. Operations 1000 begin at step 1010 where once running within a system 100, the data crawler searches for potential new data sources $920_{1-N}$ according to selection criteria 910. The selection criteria 910, in part, defines the domain that the data crawler searches for new data sources. For different embodiments, this may include a set of URL's, internet protocol addresses, network shares or folders on a distributed file system. However defined, the data source crawler 180 searches within this domain. In other words, the selection criteria 910 informs the data crawler 180 where to look for new data. Accordingly, at step 1020, the data crawler 180 identifies a data source and determines whether it is a new data source within a given data domain. If the data source is new, then the data crawler 180 proceeds to apply additional selection criteria in step 1030. Otherwise, the data crawler 180 returns to step 1010 and continues to search for new data sources.

In step 1030, the data crawler applies selection criteria 910 to identify whether to configure the query engine 170 to include the new data source when executing search queries (e.g., the sub-queries $516_{1-N}$ from FIG. 5). In an environment that includes a data abstraction model, the data crawler adds the new data source to the data model (e.g., the data repository abstraction component 148 and abstract query interface 146). Such selection criteria may include, for example, searching for new data instances of specified data source types including new relational data sources, spreadsheet data sources and XML data sources. In general, the list of data source types searched for includes those which the federated query engine 170 may be configured to query.

For some embodiments, once the data crawler discovers a potential new data source type, it may further inspect the data source based on the terms (or synonyms thereof) found within the schema for the data source. Further, the underlying data content of a data source may also be compared against the selection criteria 910. For example, selection criteria 910 may be configured to identify relational data sources containing data on the term "heart." In this case, the data crawler 180 would look for relational data sources whose schemas (i.e., table or column names) included the term heart, coronary and other possible synonyms. Within such a data source, selection criteria 910 may specify the kind of data desired for a given data model. For example, the data crawler 180 might use data content to distinguish between relational data sources that contain "heart" in their schema based on data content related to a blood pressure in one relational data source and data related to heart disease in another. As those skilled in the art will understand, a number of strategies may be employed to locate new data sources using content based criteria, including data sampling techniques or searching preexisting text indices that may exist for a data source.

In step 1030, using the selection criteria 910 as described above, the data source crawler 180 determines whether to include the new data source in the data model. If the new data source does not satisfy the selection criteria 910, the data crawler 180 returns to step 1010 and continues to search for new data sources. If the new data source does satisfy the selection criteria 910, the data crawler 180 has discovered a data source to include in the abstract data model.

In step 1040, the data crawler 180 updates the runtime component 150 and abstract query engine 160 so that the queries executed by the runtime component 150 encompass the data source when executing queries. In a distributed environment, the data crawler also configures the federated query engine 170 included as part of run time component 150 with the location of the new data source (e.g., a URL or a port running a service), the type of data source (e.g. a relational data source, XML data source, procedural data source etc.) and the data elements (e.g., rows and tables for a relational data source) available to compose queries executed against the data source. Once configured, the federated query engine 170 includes the new data source when executing queries.

In embodiments that include an abstract data layer, the data crawler also configures the data repository abstraction component 148. Specifically, in step 1050, the data crawler adds field specifications comprising additional logical field names 210 and corresponding access methods 212. The same selection criteria 910 used to identify new data sources that are interesting to a particular abstract data model may be used to define new logical fields the data source crawler 180. For example, the data crawler might associate a new data source containing information on cardiovascular disease with a general category of disease included in the data model. Alternatively, the data crawler may create entirely new fields specific to the new data source within the abstract data model. The selection criteria 910 may include rules that describe how new data sources may be related to other information in the abstract data model. For example, a new data source concerning patient lab test results identified by the data source crawler may allow new logical fields to be created in the data repository abstraction component 148 to tie other patient data sources like demographic information to the newly found lab test results. Information included in selection criteria 910 may indicate how key fields in a new data source relate to key fields in other data sources present in the data abstraction model.

FIG. 9 illustrates 4 potential new data sources $920_{1-N}$. After evaluation by the data source crawler 180 according to operations 1000, three of these data sources ($920_2$, $920_3$ and $920_N$) are illustrated as having been added to the abstract data model whereas $920_1$ failed to satisfy selection criteria 910, and thus is not added to the data repository abstraction component 148. Accordingly, the federated query engine does not access data source $920_1$ when executing queries.

For each logical field added to the data abstraction model, the data crawler also adds an access method. For remote data sources (e.g., in a federated environment), the field includes a location specification 610 and access parameters 612 as depicted in FIG. 6. The access method type may be any type supported by the federated query engine 170, e.g., simple, composed, filtered, and the like. After configuring the federated query engine 170, the data crawler 180 updates the data repository abstraction component 148 to include the new data source. The data crawler 180 then returns to step 1010 and continues to search for appropriate new data sources.

Figure 11:
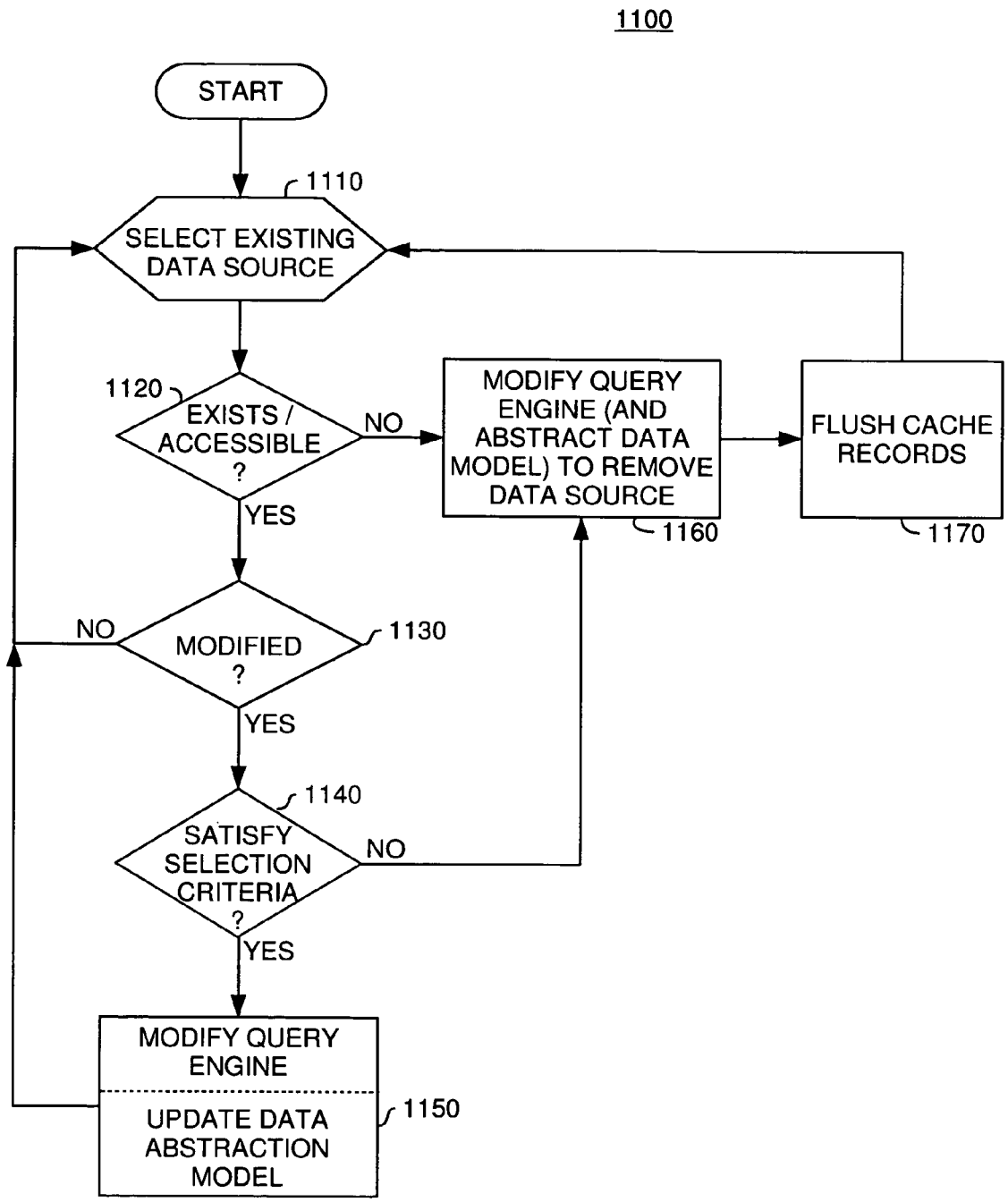

As described above, the data crawler 180 seeks out new data sources $920_{1-N}$ and makes them available for querying by runtime component 150. For some embodiments, the data crawler may also periodically confirm the vitality of existing data sources. FIG. 11 describes operations that a data crawler 180 may use to maintain databases 156 and 157.

The periodic confirmation of existing data sources 1100 begins at step 1110. At steps 1120 and 1130, for each existing data source 156 and 157, the data crawler 180 confirms that the data source still exists and remains accessible in step 1120. In a distributed environment, for example, a data source may be found on the network by the data crawler 180 and added to the data repository abstraction component 148. At some later point in time, the same data source may be deleted or otherwise no longer accessible. In such a case, at step 1160, the data crawler 180 updates the data repository abstraction component 148 to indicate that the logical field from the data source is currently unavailable, or alternatively, may remove the fields from the data repository abstraction component 148. For embodiments that cache certain remote data retrieved in response to queries, at step 1070, the data crawler 180 causes any data cached from the unavailable data source to be flushed and may also delete stored queries.

At step 1130, if the data source is still accessible the data crawler 180 determines whether the data source has been modified by comparing the current schema and content for the data source with current query execution runtime data and abstract data models configured for the data source. For example, a relational database may have its physical tables renamed or have new columns added to a physical table. Next, in step 1140, for existing data sources that have been modified, the data crawler determines whether the modified data source still satisfies the selection criteria 910. If so, in step 1150, the data crawler 180 configures the federated query engine 170, and if operating in an environment that includes a data abstraction layer, updates the fields in the data repository abstraction component 148. If the modified data source no longer satisfies the selection criteria 910, step 1160 is performed to either indicate that the logical fields from the data source are no longer available or, alternatively, remove the fields from the data repository abstraction component altogether. Step 1170 is also performed when the modified data source no longer satisfies selection criteria, resulting in any data cached from the data source to be flushed and deletion of stored queries involving the data source.

For some embodiments, the data crawler 180 is alerted to any failure resulting from a query executed by runtime component 150 against a data source. The data crawler 180 determines whether to remove the data source associated with the failed query from the runtime component 150 and data repository abstraction component 148. For example, a remote data source may become unavailable at any time, but the data crawler 180, however, may only periodically verify the availability of the same remote data source. If a user tries to query this data source during the latency between periodic confirmations of a data source, an error occurs. When this happens the data crawler 180 may be notified of the failed query and dispatched to investigate the error. If the data crawler determines that the data source is no longer available, then the data source crawler updates the run time component 150 and the data repository abstraction component 148. In addition, in an embodiment where users may save and later retrieve queries or where the system caches data retrieved from a remote data source, the data crawler 180 updates these objects as well.

In various embodiments, numerous advantages over the prior art are provided. In one aspect, advantages are achieved by automating a software agent to search for new data sources available in a distributed environment. Rather than adding new data sources manually each time one is located, the software agent manages searching for new data sources and modification of the abstract data model, thereby extending the model to include new fields corresponding to the new physical data source. In addition, existing data sources are dynamic, i.e., data sources evolve over time. In both respects, the software agent provides a self managing system reducing the amount of system configuration that must occur manually. In addition, the software agent maintains a robust domain of physical data sources that may be queried through the abstraction layer.

In another aspect, the ease-of-use for the application builder and the end-user is facilitated. Use of an abstraction layer to represent logical fields in an underlying data repository enables an application developer to focus on key application data requirements without concern for the details of the underlying data representation. As a result, higher productivity and reduced error rates are achieved during application development. With regard to the end user, the data crawler maintains a robust set of underlying data available through the logical fields. Nonessential (or privileged) content that is not needed by a particular class end-user developing the given query remains hidden. Moreover, using different selection criteria for different users, the interface exposed to a user through the logical fields may be tailored for different end user's roles within an organization.

Further, the presence of multiple data sources is used advantageously. The data crawler may search, find and select new data sources in automated fashion much more efficiently and effectively than relying on a system administrator or other means to manually maintain an ever-changing set of underlying data. In this manner, an infrastructure is provided which is capable of capitalizing on the distributed environments prevalent today.

Solutions implementing this model use the provided abstract query specification to describe its information requirements, without regard for the location or representation of the data involved. Queries are submitted to the runtime component which uses the data repository abstraction component to determine the location and method used to access each logical piece of information represented in the query. In one embodiment, the runtime component also includes the aforementioned data caching function to access the data cache. Operating in this environment, the data crawler periodically monitors the known data sources for changes and updates the runtime component accordingly. In addition, when errors occur, the data crawler may be dispatched to investigate and update the runtime component, reducing the rate of error responses generated by the system.

In one aspect, this model allows solutions to be developed, independent of the physical location or representation of the data used by the solution, making it possible to easily deploy the solution to a number of different data topologies and allowing the solution to function in cases where data is relocated or reorganized over time. In another aspect, this approach also simplifies the task of extending a solution to take advantage of additional information. Extensions to the model are automated and made at the abstract query level regardless of the underlying physical representation of the new data being accessed. This method provides a common data access method for software applications that is independent of the particular method used to access data and of the location of each item of data that is referenced. The physical data accessed via an abstract query may be represented relationally (in an existing relational database system), hierarchically (as XML) or in some other physical data representation model. A multitude of data access methods are also supported, including those based on existing data query methods such as SQL and XQuery and methods involving programmatic access to information such as retrieval of data through a Web Service invocation (e.g., using SOAP) or HTTP request.

Note that any reference herein to particular values, definitions, programming languages and examples is merely for purposes of illustration. Accordingly, the invention is not limited by any particular illustrations and examples. Further, while aspects of the invention are described with reference to SELECTION operations, other input/output operation are contemplated, including well-known operations such as ADD, MODIFY, INSERT, DELETE and the like. Of course, certain access methods may place restrictions on the type of abstract query functions that can be defined using fields that utilize that particular access method. For example, fields involving composed access methods are not viable targets of MODIFY, INSERT and DELETE.

While the foregoing is directed to embodiments of the present invention, other and further embodiments of the invention may be devised without departing from the basic scope thereof, and the scope thereof is determined by the claims that follow.

What is claimed is:

1. A method of providing access to data in an environment of multiple data repositories, comprising:
providing, for a requesting entity, a data abstraction model comprising a plurality of logical fields for composing an abstract query;
for each of the plurality of logical fields, providing an access method which specifies at least a method for accessing the data and a location of the data;
invoking an automated software agent configured to traverse a data domain; and
updating the data abstraction model in response to determinations made by the automated software agent.

2. The method of claim 1, wherein updating the data abstraction model comprises modifying the data abstraction model to include logical fields and access methods to reflect a data repository that becomes available after a prior invocation of the automated software agent.

3. The method of claim 1, wherein updating the data abstraction model comprises modifying the data abstraction model to remove logical fields and access methods to reflect a data repository that becomes inaccessible after a prior invocation of the automated software agent.

4. The method of claim 1, wherein updating the data abstraction model comprises modifying the data abstraction model to remove logical fields and access methods to reflect a data repository that become inaccessible after a prior invocation of the automated software agent and to include logical fields and access methods to reflect a data repository that becomes available after a prior invocation of the automated software agent.

5. The method of claim 1, wherein the automated software agent is configured to evaluate data repositories according to a set of selection criteria.

6. The method of claim 5, wherein the selection criteria comprises a set of rules based on data repository location, schema and content.

7. The method of claim 5, wherein updating the data abstraction model comprises modifying the data abstraction model to include logical fields and access methods to reflect a data repository that becomes available after a prior invocation of the automated software agent.

8. The method of claim 5, wherein updating the data abstraction model comprises modifying the data abstraction model to remove logical fields and access methods to reflect a data repository that becomes inaccessible after a prior invocation of the automated software agent.

9. The method of claim 5, wherein updating the data abstraction model comprises modifying the data abstraction model to remove logical fields and access methods to reflect a data repository that become inaccessible after a prior invocation of the automated software agent and to include logical fields and access methods to reflect a data repository that becomes available after a prior invocation of the automated software agent.

10. The method of claim 1, wherein the software agent is further configured to respond to a message generated by a failure of a query to access a particular data repository and to modify data abstraction model to remove logical fields and access methods related to the particular data repository.

11. The method of claim 1, further comprising: (i) traversing, by the automated software agent, a predefined domain; and (ii) inspecting, by the automated software agent, data repositories present in the predefined domain.

12. The method of claim 11, wherein the data domain comprises a plurality of data repositories accessible from within a distributed network environment identified according to at least one uniform resource locator (URLs), internet protocol address, network share, or folder on a distributed file system.

13. The method of claim 11, wherein updating the data abstraction model comprises modifying the data abstraction model to include logical fields and access methods to reflect a data repository that becomes available after a prior invocation of the automated software agent.

14. The method of claim 11, wherein updating the data abstraction model comprises modifying the data abstraction model to remove logical fields and access methods to reflect a data repository that becomes inaccessible after a prior invocation of the automated software agent.

15. The method of claim 11, wherein updating the data abstraction model comprises modifying the data abstraction model to remove logical fields and access methods to reflect a data repository that become inaccessible after a prior invocation of the automated software agent and to include logical fields and access methods to reflect a data repository that becomes available after a prior invocation of the automated software agent.

16. The method of claim 1, wherein at least one of the access methods is a first type of access method and at least one of the access methods is a second type of access method.

17. A method of providing access to data in an environment of multiple data repositories, comprising:
  providing, for a requesting entity, a data abstraction model comprising a plurality of logical fields for composing an abstract query; and for each of the plurality of logical field, specifying at least an access method for accessing data and a location of the data in one or more of a set of data repositories; and
  invoking the automated software agent configured to:
    (i) traverse a data domain to identify potential additional data repositories;
    (ii) evaluate identified potential additional data repositories for inclusion in the set of data repositories;
    (iii) update the data abstraction model to reflect potential additional data repositories that satisfy the evaluation according to a set of selection criteria;
    (iv) periodically evaluate the plurality of data repositories according to the selection criteria; and
    (v) update the data abstraction model based on the periodic evaluation of existing data sources according to the selection criteria.

18. A non-transitory computer readable storage medium containing a program executable on a processor that performs operations to access to data in an environment of multiple data repositories, the operations comprising:
  providing access to a data abstraction model comprising a plurality of logical fields for composing an abstract query; wherein each of the plurality of logical fields includes an access method which specifies at least a method for accessing the data and a location of the data;
  invoking the automated software agent configured to traverse a data domain; and
  updating the data abstraction model in response to determinations made by the self-managing software agent.

19. The non-transitory computer readable storage medium of claim 18, wherein updating the data abstraction model comprises modifying the data abstraction model to include logical fields and access methods to reflect a data repository that becomes available after a prior invocation of the automated software agent.

20. The non-transitory computer readable storage medium of claim 18, wherein updating the data abstraction model comprises modifying the data abstraction model to remove logical fields and respective access methods to reflect a data repository that becomes inaccessible after a prior invocation of the automated software agent.

21. The non-transitory computer readable storage medium of claim 18, wherein updating the data abstraction model comprises modifying the data abstraction model to remove logical fields and respective access methods to reflect a data repository that become inaccessible after a prior invocation of the automated software agent and to include logical fields and access methods to reflect a data repository that becomes available after a prior invocation of the automated software agent.

22. The non-transitory computer readable storage medium of claim 18, wherein the automated software agent is configured to evaluate data repositories according to a set of selection criteria.

23. The non-transitory computer readable storage medium of claim 22, wherein the selection criteria comprises a set of rules based on data repository location, schema and content.

24. The non-transitory computer readable storage medium of claim 22, wherein updating the data abstraction model comprises modifying the data abstraction model to include logical fields and access methods to reflect a data repository that becomes available after a prior invocation of the automated software agent.

25. The non-transitory computer readable storage medium of claim 22, wherein updating the data abstraction model comprises modifying the data abstraction model to remove logical fields and respective access methods to reflect a data repository that becomes inaccessible after a prior invocation of the automated software agent.

26. The non-transitory computer readable storage medium of claim 22, wherein updating the data abstraction model comprises modifying the data abstraction model to remove logical fields and respective access methods to reflect a data repository that become inaccessible after a prior invocation of the automated software agent and to include logical fields and access methods to reflect a data repository that becomes available after a prior invocation of the automated software agent.

27. The non-transitory computer readable storage medium of claim 18, wherein the software agent is further configured to respond to a message generated by a failure of a query to access a particular data repository and to modify data abstraction model to remove logical fields and access methods related to the particular data repository.

28. The non-transitory computer readable storage medium of claim 18, further comprising: (i) traversing, by the automated software agent, a predefined domain; and (ii) inspecting, by the automated software agent, data repositories present in the predefined domain.

29. The non-transitory computer readable storage medium of claim 28, wherein the data domain comprises a plurality of data repositories accessible from within a distributed network environment identified according to at least one uniform resource locator (URLs), internet protocol address, network share, or folder on a distributed file system.

30. The non-transitory computer readable storage medium of claim 28, wherein updating the data abstraction model comprises modifying the data abstraction model to include logical fields and access methods to reflect a data repository that becomes available after a prior invocation of the automated software agent.

31. The non-transitory computer readable storage medium of claim 28, wherein updating the data abstraction model comprises modifying the data abstraction model to remove logical fields and access methods to reflect a data repository that becomes inaccessible after a prior invocation of the automated software agent.

32. The non-transitory computer readable storage medium of claim 28, wherein updating the data abstraction model comprises modifying the data abstraction model to remove logical fields and access methods to reflect a data repository that become inaccessible after a prior invocation of the automated software agent and to include logical fields and access methods to reflect a data repository that becomes available after a prior invocation of the automated software agent.

* * * * *